United States Patent [19]

Bartels

[11] E Re. 31,141

[45] Reissued Feb. 8, 1983

[54] WINDOW SHADE, CURTAIN, OR DRAPERY ROD CORNER BRACKET

[76] Inventor: Bernard E. Bartels, 621 SE. 15th Ave., Apt. 101, Boynton Beach, Fla. 33435

[21] Appl. No.: 114,792

[22] Filed: Jan. 16, 1980

Related U.S. Patent Documents

Reissue of:

[64] Patent No.: 4,167,261
Issued: Sep. 11, 1979
Appl. No.: 889,555
Filed: Apr. 17, 1978

[51] Int. Cl.[3] ..... A47H 1/10
[52] U.S. Cl. ..... 248/270; 248/258
[58] Field of Search ..... 248/251, 257, 258, 265, 248/263, 256, 266, 269, 270

[56] References Cited

U.S. PATENT DOCUMENTS

| | | | |
|---|---|---|---|
| 915,598 | 3/1909 | Hess | 248/258 |
| 2,783,014 | 2/1957 | Kenney | 248/263 |
| 2,810,540 | 10/1957 | Wallace | 248/263 |
| 2,843,970 | 7/1958 | Keuls | 248/220.3 X |
| 2,974,918 | 3/1961 | Voigtlander | 248/256 X |
| 3,211,409 | 10/1965 | Zimmermann | 248/223.1 X |

*Primary Examiner*—J. Franklin Foss
*Attorney, Agent, or Firm*—Malin & Haley

[57] ABSTRACT

A corner bracket for use in mounting and locating a mounting bracket for a window covering including an inverted L-shaped mounting plate having a plurality of preformed slots and holes for receiving the mounting bracket in a predetermined location and at least one perpendicular laterally extending flange for abutment with a support surface adjacent a window opening for locating the mounting plate in the corner of the window opening.

4 Claims, 6 Drawing Figures

WINDOW SHADE, CURTAIN, OR DRAPERY ROD CORNER BRACKET

Matter enclosed in heavy brackets [ ] appears in the original patent but forms no part of this reissue specification; matter printed in italics indicates the additions made by reissue.

BACKGROUND OF THE INVENTION

This invention relates to a bracket for mounting a window shade, curtain, or drapery rod.

Anyone that has had to hang draperies, curtains, or window shades has gone through the time consuming procedure of having to measure and level the brackets at opposite corners of the window, as well as any intermediate bracket. Further, in older homes with side trim about the window mitered at corners, the wood will split when a nail or screw is inserted through the bracket into the mitered joint, necessitating the relocation of the nail or screw, as well as the bracket, lower on the trim. In newer homes having narrow trim or no trim around the window, as for example, where metal sliding windows are installed, the measuring and leveling problem referred to is even more pronounced.

SUMMARY OF THE INVENTION

Accordingly, this invention relates to a bracket for mounting a window covering, whether on a wall adjacent a window or on the window trim itself, without measuring the proper location of the brackets relative to each other and the window, or leveling the brackets. In accordance with the invention, a bracket having at least one laterally extending flange and a planar mounting surface is positioned and fastened to the corner of the window trim or window opening by abutting the lateral flange with the trim or the interior corner of the window opening. A variety of different type window covering mounting brackets can then be secured to the planar mounting surface of the corner bracket in preformed holes or slots on the planar surface.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENTS

Figures 1, 2, 3, 4, 5, 6:
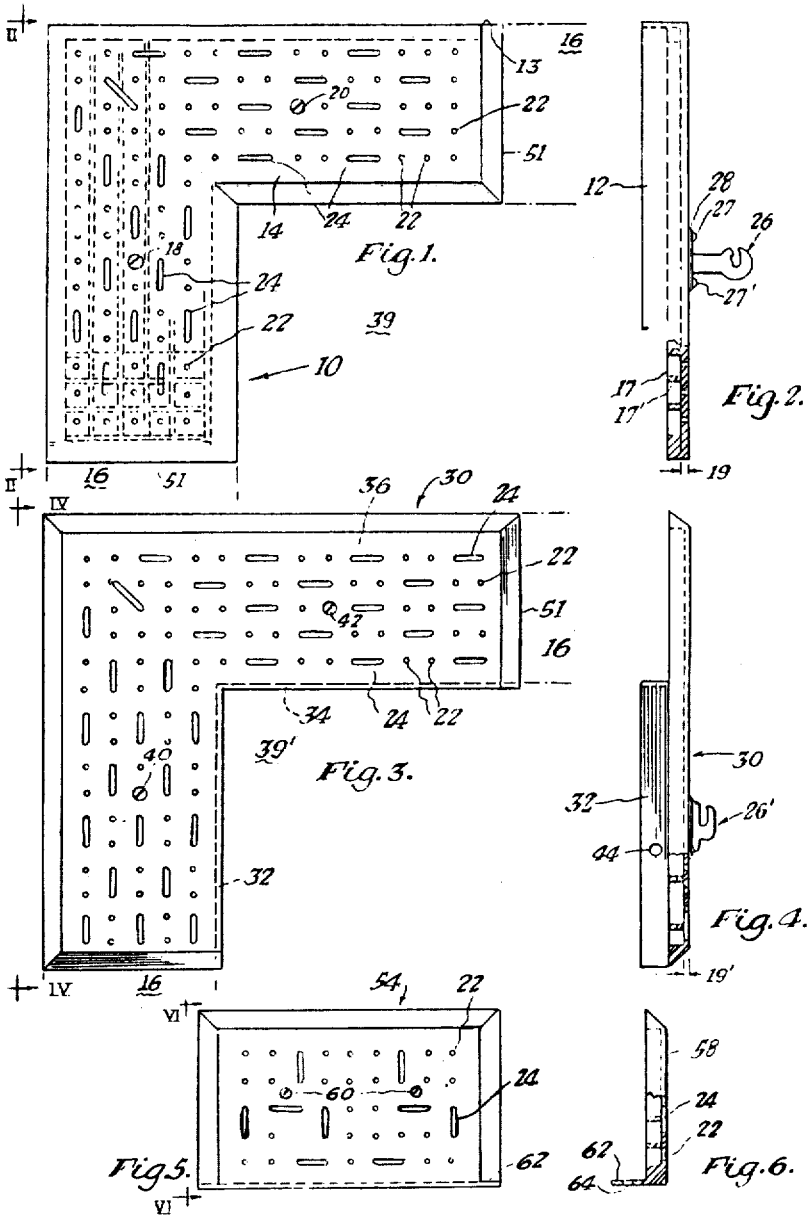
FIG. 1 is a front view of a corner bracket of the present invention connected to the trim of a window for use with various mounting connectors.
FIG. 2 is a side view of the corner bracket shown in FIG. 1 partially broken away.
FIG. 3 is a front view of another corner bracket of the present invention with inside flanges connected to the wall.
FIG. 4 is a side view of FIG. 3 partially broken away.
FIG. 5 is a front view of an intermediate bracket.
FIG. 6 is a side view of the intermediate bracket shown in FIG. 5 which can be used between two corner brackets.

Referring now to the drawing in detail, wherein like numerals indicate like elements throughout the several views, and particularly FIGS. 1 and 3, a bracket 10 or 30 having at least one laterally extending flange 12 or 32 and 34 and a planar mounting surface 14 or 36 is positioned on the corner of a window trim 16. In FIG. 1, the bracket 10 is mounted by abutting the lateral flange 12 with the outer side portion of the trim 16. A top flange may be included on the upper edge of surface 14. The ends 51 do not have flanges attached thereto. In FIG. 3, the bracket 30 is mounted by abutting the lateral flanges 32 and 34 with the inside portion of the trim 16. Without measuring or leveling the position of brackets 10 and 30, each is fastened to trim 16 by suitable fasteners, such as screws 18 and 20, or 40 and 42 in the window openings at 39 and 39'.

Planar mounting surfaces 14 and 36 include a plurality of preformed holes 22 and slots 24 spaced over the surfaces 14 and 36 for securing a variety of window covering mounting connectors such as 26 in FIG. 2 in a predetermined position on brackets 10 and 30. The slots allow minor and major vertical adjustment of the connector.

Window shade end connectors 26 or 26', shown in FIGS. 2 and 4 can have its flange 28 secured by screws 27 and 27' in holes 22 in the slots. Window shade end bracket 29 shown in FIGS. 2 and 4 can be connected to the bracket 30 by placing portions 31 and 31' in slots 24. A corresponding end connector can be similarly positioned in the preformed holes or slots on a bracket at the opposite upper edge of the window or on the intermediate bracket. The opposite bracket, not shown, is a mirror image of brackets 10 or 30 respectively on the other side of the window. The use of the corresponding holes or slots or preferred holes or slots on the opposite upper edge of the window to assure that the mounting brackets 26 or 26' are level and generally in the same plane.

Where the window to be covered is devoid of trim 16 or has thin trim, a bracket 30 shown in FIG. 3 may be used. Bracket 30 includes a pair of perpendicular laterally extending flanges 32 and 34 and is used to position a planar mounting surface 36 on the wall surrounding the window opening 39. The flanges 32 and 34 extend perpendicularly inwardly from the innermost edges of the L-shaped mounting plate 36 into abutment with the corner of window opening 39. The ends 51 do not have flanges attached thereto. Mounting plate 36 is secured to wall 38 by screw fasteners 40 and 42. Preformed holes 22 and slots 24 are formed in mounting plate 36 for mounting a variety of connectors similarly to mounting plate 14 of bracket 10.

The brackets 10 and 30 have thickness 19 or 19'. The ribs 17 and 17' have a thickness that allows the connector screw end to be positioned between the wall and the underside of the bracket or between the trim and the under side of the bracket. Rib pieces 17 and 17' hold the bracket or face plate off the wall or trim.

As shown in FIG. 4, bracket 30 has a prestamped flange 32 and also has an outer plate spaced from the wall. Suitable decorative designs, such as a fan design, may be attached to mounting plate 14 or 36 to provide a decorative effect over the brackets. Additional fasteners may also be inserted through holes 44 in the flanges 12, 32, or 34 for further securement of the brackets 10 and 30 to the trim 16 or wall.

One or more intermediate brackets 54 shown in FIGS. 5 and 6 may be used with a pair of the corner brackets 10 and 30. An intermediate mounting connector may be connected to the intermediate bracket where necessary. Intermediate bracket 54 includes a vertical mounting plate 58 fastened to trim or wall by fasteners 60. Horizontal lateral flange 62 connected to the plate 58 is in abutment with the bottom surface of trim or the wall positions. The mounting plate 58 may be placed at the correct height relative to the corner brackets and slots 24 and holes 22 are provided for locating and receiving appropriate types of mounting connectors. When trim is unavailable, bracket 54 can be used as shown and mounted beneath the upper edge of window opening by inserting suitable fasteners through holes 64 so that the intermediate mounting brackets are positioned at the same height as the mounting brackets on the corners.

It should be noted that a lattus arrangement of ribs may be connected to the back of the front plates of the brackets 10 and 30. The brackets 10 and 30 have solid portions around the outside perimeter of the rear of the brackets so this solid portion allows the brackets 10 and 30 to be attached to the wall with an adhesive.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A [ribbed], self-positioning corner bracket eliminating measuring during mounting for use in mounting a window covering upon a mounting bracket, comprising:

a substantially planar inverted L-shaped mounting plate adapted to be secured on a surface near a corner of a window opening;

at least one laterally extending flange generally perpendicular to said mounting plate attached to an edge of said mounting plate for locating said mounting plate in the corner of said window opening precluding measuring of said mounting bracket; and a plurality of preformed holes and adjusting slots in vertical and horizontal arrays in said mounting plate for receiving and locating a mounting bracket for a window covering.

2. A corner bracket as set forth in claim 1, wherein:

said laterally extending flange is attached to an outer edge of said inverted L-shaped mounting plate for eliminating measuring while butting said corner bracket against a horizontal side wall.

3. A corner bracket as set forth in claim 1, including:

two perpendicular laterally extending flanges attached to the inner edges of said inverted L-shaped mounting plate for butting said corner bracket against a side wall for connecting a free from measuring mounting bracket thereto.

4. A corner bracket as set forth in claim 1, including:

a mid plate for supporting the middle of a curtain rod.

* * * * *